United States Patent
Vo et al.

(10) Patent No.: US 10,432,621 B2
(45) Date of Patent: Oct. 1, 2019

(54) TOGGLING BIOMETRIC AUTHENTICATION

(71) Applicant: United Services Automobile Association (USAA), San Antonio, TX (US)

(72) Inventors: Hoang Trung Vo, San Antonio, TX (US); John Raymond Harris, San Antonio, TX (US); Rochelle Ann Tijerina, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 25 days.

(21) Appl. No.: 15/052,548

(22) Filed: Feb. 24, 2016

(65) Prior Publication Data

US 2016/0241555 A1 Aug. 18, 2016

Related U.S. Application Data

(63) Continuation of application No. 14/620,786, filed on Feb. 12, 2015, now Pat. No. 9,305,155.

(51) Int. Cl.
| | |
|---|---|
| *H04W 12/06* | (2009.01) |
| *G06K 9/00* | (2006.01) |
| *G06K 9/62* | (2006.01) |
| *G06F 21/31* | (2013.01) |
| *G06F 21/32* | (2013.01) |
| *G06F 21/45* | (2013.01) |
| *G06F 21/60* | (2013.01) |

(Continued)

(52) U.S. Cl.
CPC ........ *H04L 63/0861* (2013.01); *G06F 3/0482* (2013.01); *G06F 3/04817* (2013.01); *G06F 3/04842* (2013.01); *G06F 21/31* (2013.01); *G06F 21/32* (2013.01); *H04L 63/083* (2013.01)

(58) Field of Classification Search
CPC .......... G06F 21/31; G06F 21/32; G06F 21/45; G06F 21/60; G06K 9/00; G06K 9/62; H04W 12/06
USPC ........... 726/2–4, 16, 17, 21, 26–28; 709/219
See application file for complete search history.

(56) References Cited

U.S. PATENT DOCUMENTS

| | | | |
|---|---|---|---|
| 6,957,337 B1 * | 10/2005 | Chainer | G06F 21/32 713/168 |
| 7,007,298 B1 | 2/2006 | Shinzaki et al. | |

(Continued)

OTHER PUBLICATIONS

Thomas, International Search Report and Written Opinion for International application No. PCT/US15/28705, dated Aug. 5, 2015, 7 pages.

(Continued)

*Primary Examiner* — Beemnet W Dada
*Assistant Examiner* — Kalish K Bell
(74) *Attorney, Agent, or Firm* — Fletcher Yoder, P.C.

(57) ABSTRACT

Methods, systems, and apparatus, including computer programs encoded on a computer storage medium, for receiving user input indicating a first user selection of a first form of biometric authentication from a plurality of forms of biometric authentication, providing a first interface for display on a user device, the first interface corresponding to the first form, receiving first biometric data, the first biometric data being provided using the first interface, and selectively enabling communication between the user device and a back-end system based on the first biometric data.

17 Claims, 5 Drawing Sheets

(51) Int. Cl.
*H04L 29/06* (2006.01)
*G06F 3/0481* (2013.01)
*G06F 3/0482* (2013.01)
*G06F 3/0484* (2013.01)

(56) References Cited

U.S. PATENT DOCUMENTS

| | | |
|---|---|---|
| 2004/0133582 A1 | 7/2004 | Howard et al. |
| 2004/0257196 A1* | 12/2004 | Kotzin ............... G07C 9/00142 |
| | | 340/5.52 |
| 2007/0061590 A1 | 3/2007 | Boye et al. |
| 2007/0177777 A1 | 8/2007 | Funahashi et al. |
| 2008/0211627 A1 | 9/2008 | Shinzaki |
| 2009/0064296 A1 | 3/2009 | Aikawa et al. |
| 2011/0035788 A1 | 2/2011 | White et al. |
| 2012/0204259 A1 | 8/2012 | Nakamura |
| 2013/0036458 A1 | 2/2013 | Liberman et al. |
| 2013/0133049 A1* | 5/2013 | Peirce ................ G06K 9/00926 |
| | | 726/6 |
| 2014/0250515 A1* | 9/2014 | Jakobsson ............... G06F 21/32 |
| | | 726/7 |
| 2014/0313007 A1* | 10/2014 | Harding ............. G07C 9/00158 |
| | | 340/5.52 |

OTHER PUBLICATIONS

International Preliminary Report on Patentability in International Application No. PCT/US2015/028705, dated Aug. 15, 2017, 6 pages.

* cited by examiner

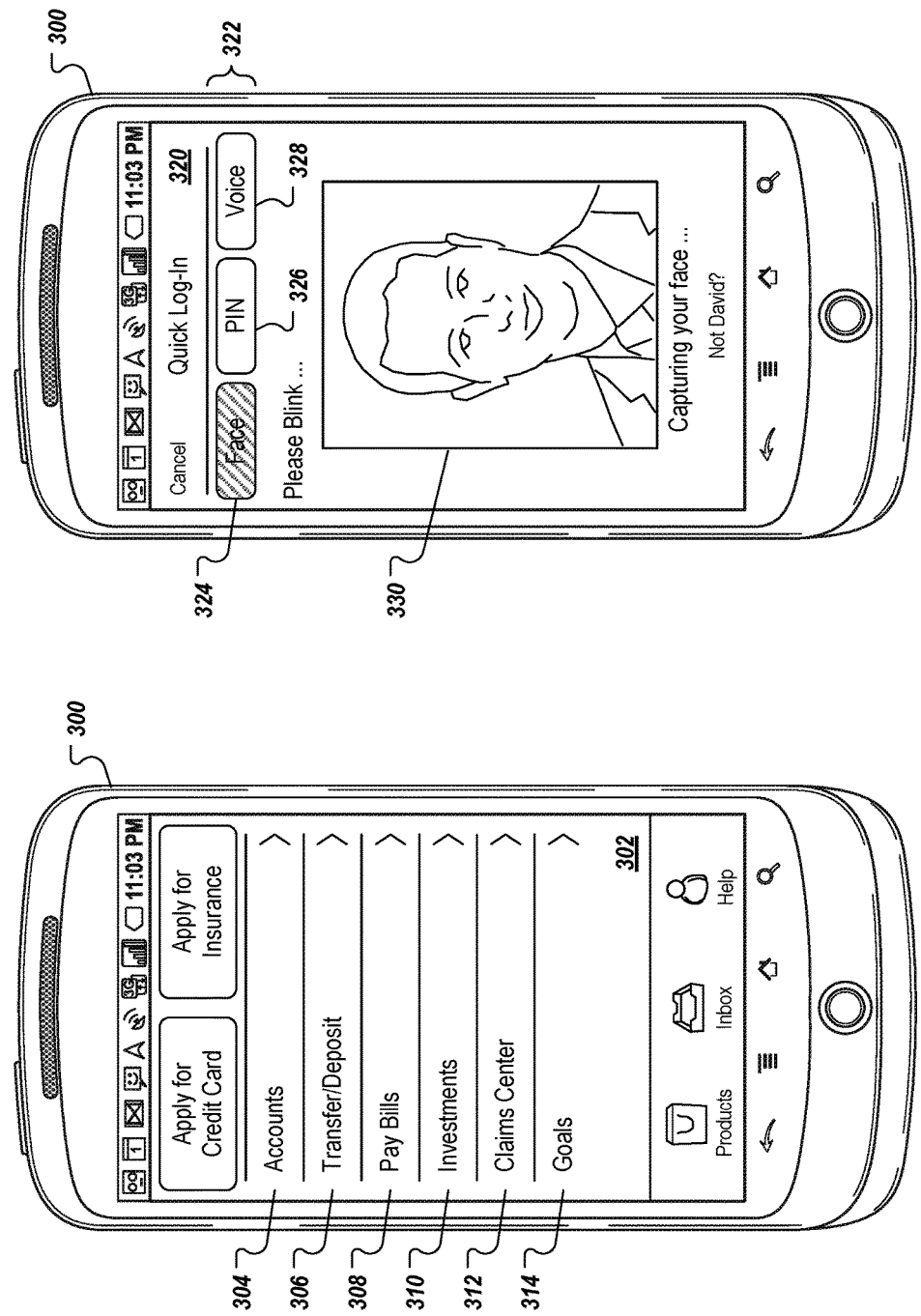

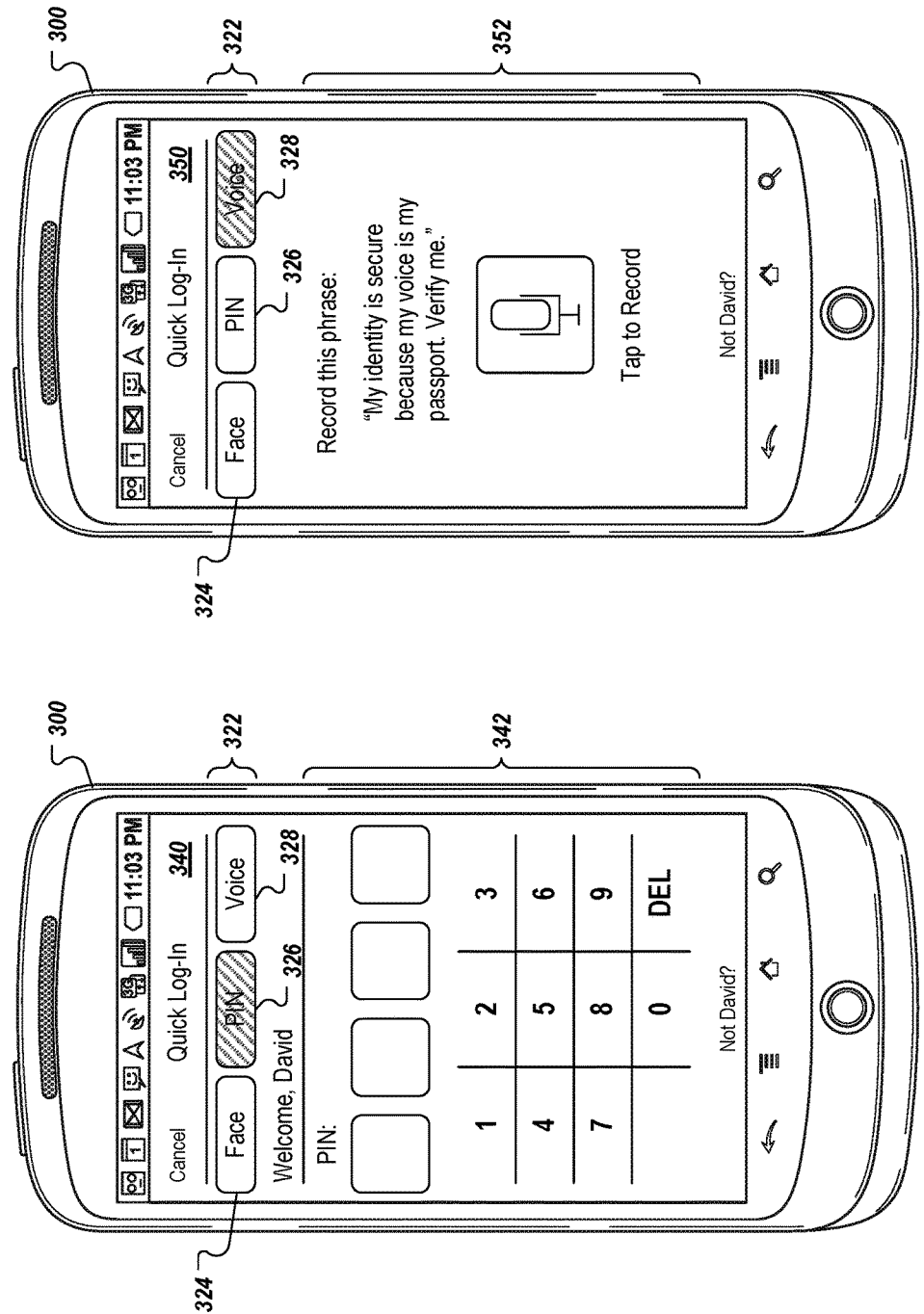

TOGGLING BIOMETRIC AUTHENTICATION

CROSS-REFERENCE TO RELATED APPLICATIONS

This application is a continuation application of and claims priority to U.S. application Ser. No. 14/620,786, filed on Feb. 12, 2015, which is hereby incorporated by reference.

BACKGROUND

User authentication is implemented to ensure that a user is who they purport to be. For example, a user of a computing device can attempt to log into a back-end system. User authentication can be implemented to ensure that the user is authorized to log into the back-end system. In some examples, authentication can be achieved based on user credentials (e.g., username password).

Biometric authentication enables users to be authenticated based on physical features that are unique to the user (e.g., facial features, voice). Biometric authentication is advantageous in that it is not easily spoofed, and that it does not require the user to remember credentials (e.g., username, password). Forms of biometric authentication, however, might not be appropriate for a particular environment that the user is in. For example, facial recognition and/or voice recognition might not be appropriate forms of biometric authentication, while the user is in a movie theater.

SUMMARY

This specification relates to enabling users to select an authentication form from a plurality of authentication forms to enable secure log-in.

Implementations of the present disclosure are generally directed to enabling users to select an authentication form from a plurality of authentication forms to enable secure log-in. More particularly, implementations of the present disclosure are directed to providing a plurality of authentication forms and enabling selection of an authentication form to authenticate a user.

In general, innovative aspects of the subject matter described in this specification can be embodied in methods that include actions of receiving user input indicating a first user selection of a first form of biometric authentication from a plurality of forms of biometric authentication, providing a first interface for display on a user device, the first interface corresponding to the first form, receiving first biometric data, the first biometric data being provided using the first interface, and selectively enabling user access to data based on the first biometric data. Other implementations of this aspect include corresponding systems, apparatus, and computer programs, configured to perform the actions of the methods, encoded on computer storage devices.

These and other implementations can each optionally include one or more of the following features: selectively enabling user access to data based on the first biometric data includes receiving an indication that a user of the user device has been authenticated based on the first biometric data, and in response, enabling communication between the user device and a back-end system; selectively enabling user access to data based on the first biometric data includes receiving an indication that a user of the user device cannot be authenticated based on the first user input, and in response, providing a menu for display on the user device, the menu displaying at least a second form of biometric authentication for selection by the user; the first form of biometric authentication is absent from the menu; actions further include: receiving user input indicating a second user selection of the second form of biometric authentication, providing a second interface for display on the user device, the second interface corresponding to the second form, receiving second biometric data, the second biometric data being provided using the second interface, and selectively enabling communication between the user device and a back-end system based on the second biometric data; actions further include providing a menu for display on the user device, the menu including graphical representations of each form of biometric authentication from the plurality of forms of biometric authentication, the first user selection being provided based on the menu; actions further include receiving a user selection from a selection screen displayed on the user device, wherein the menu is provided in response to the user selection; each graphical representation corresponds to a form of biometric authentication that the user has established with the back-end system; each graphical representation corresponds to a form of biometric authentication that the user device is capable of providing data for; the plurality of forms of biometric authentication includes two or more of facial recognition, voice recognition, fingerprint recognition, iris recognition, retina recognition, hand geometry recognition, and vein recognition; and enabling user access to data includes enabling communication between the user device and a back-end system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-3D depict screenshots that can be provided in implementations of the present disclosure.

Like reference numbers and designations in the various drawings indicate like elements.

DETAILED DESCRIPTION

Implementations of the present disclosure are generally directed to enabling users to select an authentication form from a plurality of authentication forms to enable secure log-in. More particularly, implementations of the present disclosure are directed to providing a plurality of authentication forms and enabling selection of an authentication form to authenticate a user. In some examples, the authentication forms include biometric authentication forms. Example biometric authentication forms include, without limitation, facial recognition, voice recognition, fingerprint recognition, iris recognition, retina recognition, hand geometry recognition, and vein recognition. In some examples, a user selects the authentication form, and the user-selected authentication form is used to authenticate the user. In some examples, at least one authentication form is suggested to the user for user selection.

Implementations of the present disclosure will be described in further detail with reference to an example context. The example context includes a user logging into a service through an application executed on a mobile computing device. In some examples, the service enables the user to access secure data (e.g., a banking account, through which the user can access their financial information). It is contemplated, however, that implementations of the present disclosure can be used in any appropriate context (e.g., a user remotely logging into an account to access patient data in a healthcare context).

Figure 1:
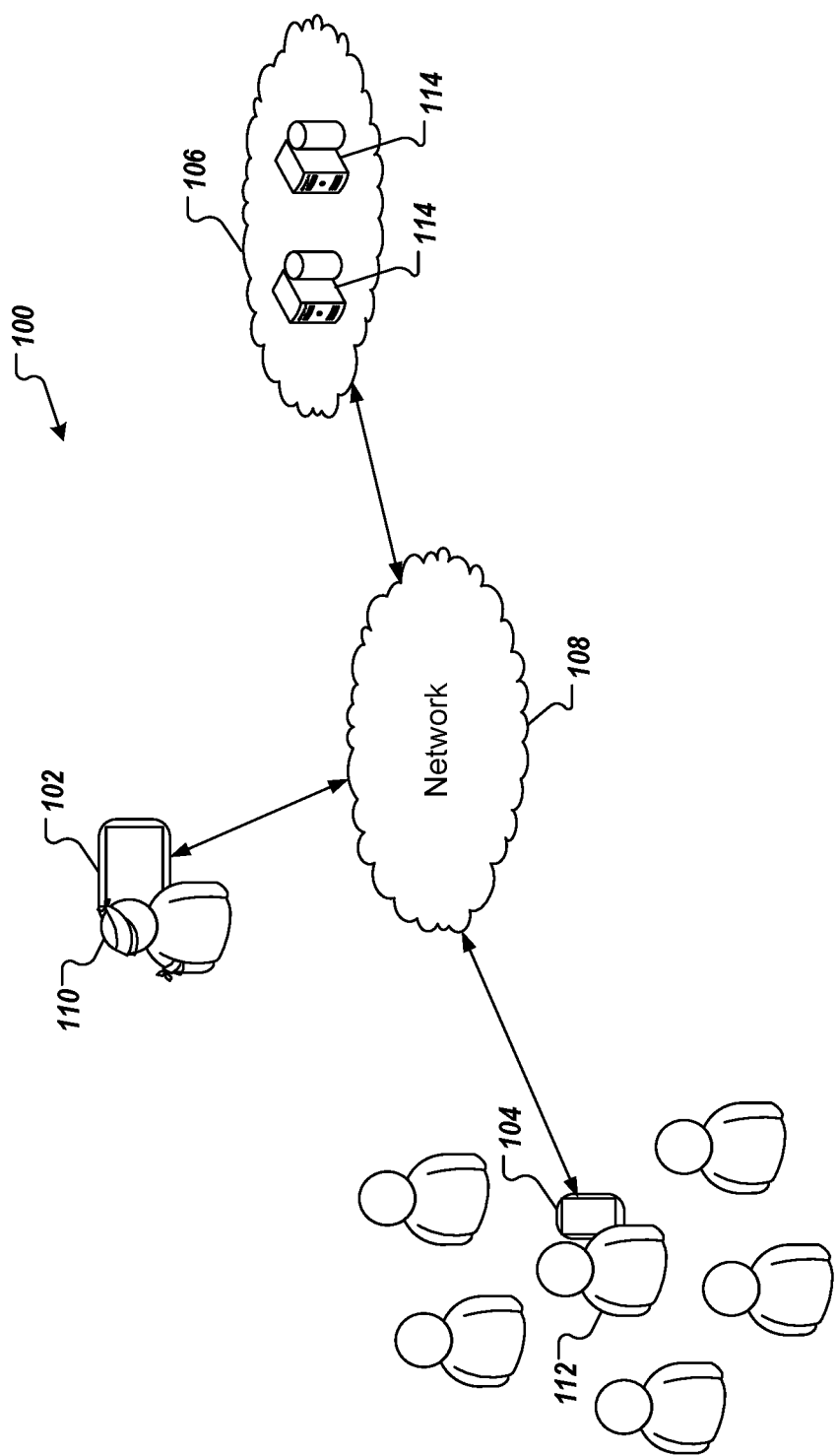
FIG. 1 depicts an example environment in accordance with implementations of the present disclosure.

FIG. 1 depicts an example environment 100, in which implementations of the present disclosure can be provided. In some examples, the example environment 100 enables a user to securely log into an account using a computing device. The example environment 100 includes computing devices 102, 104, a back-end system 106, and a network 108. In some examples, the computing devices 102, 104 are used by respective users 110, 112 to log into and interact with the back-end system 106 over the network 108.

In the depicted example, the computing device 102 is provided as a tablet computing device, and the computing device 104 is provided as a smartphone. It is contemplated, however, that implementations of the present disclosure can be realized with any appropriate computing device (e.g., smartphone, tablet, laptop computer, desktop computer). In some examples, the network 102 includes a local area network (LAN), wide area network (WAN), the Internet, or a combination thereof, and connects web sites, user devices (e.g., computing devices 102, 104), and the back-end systems (e.g., back-end system 106). In some examples, the network 108 can be accessed over a wired and/or a wireless communications link. For example, mobile computing devices, such as smartphones can utilize a cellular network to access the network 108.

In the depicted example, the back-end system 106 includes at least one server system 114. In some examples, the at least one server system 114 hosts one or more computer-implemented services that users can interact with using computing devices. For example, the computing device 102, 104 can be used to communicate with a service hosted by the back-end system 106 over the network 108. In some examples, the computing device 102, 104 includes a computer-executable application executed thereon, which can be used to log into the service and establish a communication session between the computing device 102, 104 and the back-end system 106. In some examples, the computing device 102, 104 includes a web browser application executed thereon, which can be used to display one or more web pages of the service, the user interacting with service through the web page(s).

Implementations of the present disclosure are generally directed to enabling users to select an authentication form from a plurality of authentication forms to enable secure log-in. More particularly, implementations of the present disclosure are directed to providing a plurality of authentication forms and enabling selection of an authentication form to authenticate a user.

In some implementations, the user can establish a user profile to access a service hosted by a back-end system. In some examples, the user profile includes user-specific information. Example user-specific information includes, without limitation, first name, last name, mailing address, email address and telephone number. In some examples, the user profile includes device-specific information that is unique to one or more computing devices that the user uses to access the service. For example, the device-specific information can include one or more unique identifiers (e.g., Internet Protocol (IP) addresses) assigned to respective devices that the user uses to access the service (e.g., laptop computer, desktop computer, tablet, smartphone).

In some implementations, the user profile further includes authentication information that can be used to authenticate the user. For example, the user profile can include, without limitation, a username, a password, and a personal identification number (PIN) (e.g., each selected by the user). In some examples, the user profile can include biometric data corresponding to one or more biometric authentication forms. In some examples, the user requests the ability to be authenticated based on one or more authentication forms, and, for each biometric authentication form, can provide respective biometric data. Example biometric authentication forms include, without limitation, facial recognition, voice recognition, fingerprint recognition, iris recognition, retina recognition, hand geometry recognition, and vein recognition. For example, the user can request authentication based on facial recognition or voice recognition. Consequently, the user can provide (e.g., during an enrollment session) biometric data to enable facial recognition (e.g., one or more images of the user's face) and voice recognition (e.g., one or more voice samples).

In some implementations, after the user has established a user profile, the user can log into the service that is hosted by the back-end system. For example, the user can use a computing device to provide user credentials (e.g., username, password), which can be used by the back-end service to perform a primary authentication. For example, a request can be sent from the computing device of the user to the back-end system (e.g., over a network), the request including the credentials. If the credentials that the user provides match credentials that the back-end service has stored, the user is determined to be primarily authenticated, and is able to access the service. That is, for example, a secure session is established between the computing device of the user and the back-end system (e.g., using secure sockets layer (SSL), transport layer security (TSL)). In this manner, data that is communicated between the computing device and the back-end system is encrypted for transmission.

In some examples, the primary authentication is further based on a unique identifier of and/or a token stored on the computing device that the user is using to access the back-end system. For example, a request can be sent from the computing device of the user to the back-end system (e.g., over a network), the request including the credentials and the unique identifier of and/or the token stored on the computing device. If the credentials match credentials that the back-end service has stored, and the unique identifier matches a unique identifier associated with the user profile stored at the back-end system and/or the token is determined to be authentic, the user is determined to be primarily authenticated, and is able to access the service.

In some implementations, although the user has been primarily authenticated, a secondary authentication can be performed. For example, after the user has logged into the service, the user requests access to secure data (e.g., financial data, patient data) through the service. In some examples, the secondary authentication is performed to again authenticate the user before enabling access to the secure data. In some examples, the secondary authentication can be referred to as a quick log-in that requires relatively less effort on the part of the user. For example, the secondary authentication includes authentication that is not based on credentials. In this manner, the user is not required to again input credentials (e.g., username, password).

In some implementations, the secondary authentication is performed based on one of a plurality of authentication forms. In some examples, the plurality of authentication forms includes a plurality of biometric authentication forms. In some examples, the plurality of authentication forms includes a PIN.

In accordance with implementations of the present disclosure, the authentication form that is to be used to authenticate the user can be selected. In some examples, the user can select the authentication form that is to be used to authenticate the user. Continuing with the above example, the user can select the authentication form that is to be used for secondary authentication of the user. In some examples, a list of available authentication forms is provided and includes authentication forms, for which the user has established authentication data (e.g., in the user profile). For example, if the user profile includes a PIN, facial recognition data, and voice recognition data, the list of available authentication forms includes PIN, facial recognition, and voice recognition. As another example, if the user profile includes a PIN, fingerprint recognition data, voice recognition data, and retina recognition data, the list of available authentication forms includes PIN, facial recognition, voice recognition, and retina recognition.

In some implementations, a menu of available authentication forms is displayed to the user in response to the user requesting access to secure data. For example, in response to the user selecting an "accounts" option to access one or more financial accounts, the list of available authentication forms can be determined based on the user profile, and a secondary authentication interface (e.g., "quick log-in" interface) can be displayed to the user, which includes a menu of available authentication forms based on the list of available authentication forms. In some examples, a default authentication form is selected, and a respective authentication interface is displayed. For example, the user profile can indicate a default authentication form (e.g., selected by the user as the default). As another example, the last selected authentication form selected by the user can be provided as the default authentication form.

In some implementations, the user selects an authentication form from the menu of available authentication forms, and, in response, a respective authentication interface is displayed. The user can provide authentication data using the displayed authentication interface.

For example, for facial recognition, the user can use the authentication interface to enable one or more images of the user's face to be captured (e.g., using a camera of the computing device). In some examples, each of the one or more images is encrypted for transmission over a network. In some examples, the image quality is compressed for efficient data transfer (e.g., compressed up to 80% at 640× 480 resolution). In some examples, a camera of the computing device is automatically activated to capture images in response to user selection of facial recognition. In some examples, the camera is automatically activated to again capture images in response a facial recognition authentication failure. In some examples, facial recognition can also include authenticating based on features seen in a background. In some examples, the one or more images can include a person's face, as well as background features. For example, the computing device can include an automated teller machine (ATM), with which the user is attempting facial recognition authentication using a camera of the ATM. Because the ATM camera and background features may be static, authentication can be further based on confirming that the background features are also present in the one or more images.

As another example, for voice recognition, the user can use the authentication interface to capture an audio recording of the user's voice (e.g., using a microphone of the computing device). In some examples, voice recognition is based on a voice sample of limited duration (e.g., 15 seconds). In this manner, authentication data can be efficiently transferred.

As another example, for PIN, the user can use the authentication interface to input a PIN. In some examples, authentication data provided through the authentication interface is processed to authenticate the user.

In some implementations, once the authentication data has been transmitted, the authentication data is deleted from computer-readable memory of the computing device.

In some implementations, if the user is authenticated (e.g., the authentication data provided through the authentication interface corresponds to the authentication data of the user), user access to the secure data is enabled.

In some implementations, if the user is not authenticated, authentication based on the user-selected authentication form can again be attempted. For example, a predetermined number of authentication attempts (X) can be provided for the user-selected authentication form. In some examples, if the predetermined number of authentication attempts (X) is achieved, the user is denied access to the secure data. In some examples, if a predetermined number of authentication attempts (Y) is achieved, the user is able to select another authentication form. In some examples, if a predetermined number of authentication attempts (Z) is achieved, another authentication form is suggested to the user (e.g., PIN). However, the user may still be able to continue to attempt authentication with the selected authentication form.

In some implementations, if the user is not authenticated, the user is able to select another authentication form regardless of whether a predetermined number of authentication attempts has been achieved. In some examples, an indication can be provided to indicate to the user why the authentication attempt failed. For example, if it is too dark for the camera to capture a sufficient image of the user, an indication can be received, and a message can be displayed to the user based on the indication, the message informing the user that it is too dark for facial recognition. As another example, if it is too noisy and/or the user is speaking too softly for the user's voice to be discerned, an indication can be received, and a message can be displayed to the user based on the indication, the message informing the user that it is too noisy and/or the user is speaking too softly for voice recognition.

In some implementations, one or more suggested authentication forms can be suggested to the user. In some examples, a suggested authentication form is determined based on an environmental context. For example, context data can be provided, which indicates a context of the environment that the user is located in. Example context data can include, without limitation, location data reflecting a location of the computing device (e.g., based on GPS and/or Wifi signals), image data reflecting an amount of ambient light around the computing device, and sound data reflecting a level of noise around the computing device. In some examples, context data is determined in response to the user requesting access to secure data. For example, in response to the user requesting access to secure data, a camera of the computing device is activated to capture image data, a microphone of the computing device is activated to capture sound data, and/or a location signal is provided (e.g., based on GPS signal, Wifi signal).

In some implementations, the context data is processed to determine one or more suggested authentication forms. For example, image data can be processed to determine a level of ambient light and/or image quality provided by the camera. The level of ambient light can be compared to a threshold level, and, if the level of ambient light does not exceed the threshold level, it can be determined that the environment that the user is in is too dark for facial recognition. The image quality can be compared to a threshold image quality, and, if the image quality does not exceed the threshold image quality, it can be determined that the camera is not providing the requisite image quality for facial recognition (e.g., the camera is dirty, scratched lens). If the level of ambient light meets or exceeds the threshold level, it can be determined that the environment that the user is in is sufficiently light for facial recognition. If the image quality meets or exceeds the threshold image quality, it can be determined that the image quality is sufficient light for facial recognition. As another example, audio data can be processed to determine a level of ambient noise. The level of ambient noise can be compared to a threshold level, and, if the level of ambient noise does not exceed the threshold level, it can be determined that the environment that the user is in is too noisy for voice recognition. If the level of ambient noise meets or exceeds the threshold level, it can be determined that the environment that the user is in is sufficiently quiet for voice recognition.

As another example, a location of the computing device can be determined based on the location signal and can be compared to a plurality of known locations. In some examples, the, if the location matches a known location, a suggested authentication form can be provided based on the known location. For example, if the known location is a movie theater, PIN authentication can be suggested (e.g., because facial recognition and/or voice recognition might not be appropriate). If the known location is a library, facial recognition and/or PIN authentication can be suggested (e.g., because voice recognition might not be appropriate).

In some implementations, authentication forms excluded from the user-selectable authentication forms can be determined based on the context data. In some examples, one or more authentication forms can be determined to be inappropriate based on the context data. Consequently, the one or more authentication forms are excluded from the user-selectable authentication forms, which otherwise would be included in the user-selectable authentication forms. For example, if the user profile includes a PIN, facial recognition data, and voice recognition data, the user-selectable authentication forms would include PIN, facial recognition, and voice recognition. However, if the context data indicates that there is insufficient ambient light for facial recognition, facial recognition can be excluded from the user-selectable authentication forms.

With reference to FIG. 1, two example scenarios will be used to illustrate implementations of the present disclosure. It is contemplated, however, that implementations of the present disclosure can be used in any appropriate scenario.

In a first example scenario, the user 110 had been injured and is bandaged. For example, the user 110 has suffered a head injury requiring bandages about the head, and inhibiting the ability to talk. The user 110 can use the computing device 102 to access a service hosted by the back-end system 106 over the network 108. In some examples, although the user 110 has established facial recognition, voice recognition, and PIN as available authentication forms, the user 110 can select PIN (e.g., for secondary authentication). For example, the bandages may make facial recognition impractical, and the inhibited ability to talk may make voice recognition impractical. Consequently, the user 110 can select PIN.

In a second example scenario, the user 112 is in a crowded location (e.g., at a concert, at the theater, at a sporting event). The user 112 can use the computing device 104 to access a service hosted by the back-end system 106 over the network 108. In some examples, although the user 112 has established facial recognition, voice recognition, and PIN as available authentication forms, the user 112 can select PIN (e.g., for secondary authentication). For example, the environment that the user 112 is in may make facial recognition and voice recognition impractical. Consequently, the user 112 can select PIN.

Figure 2:
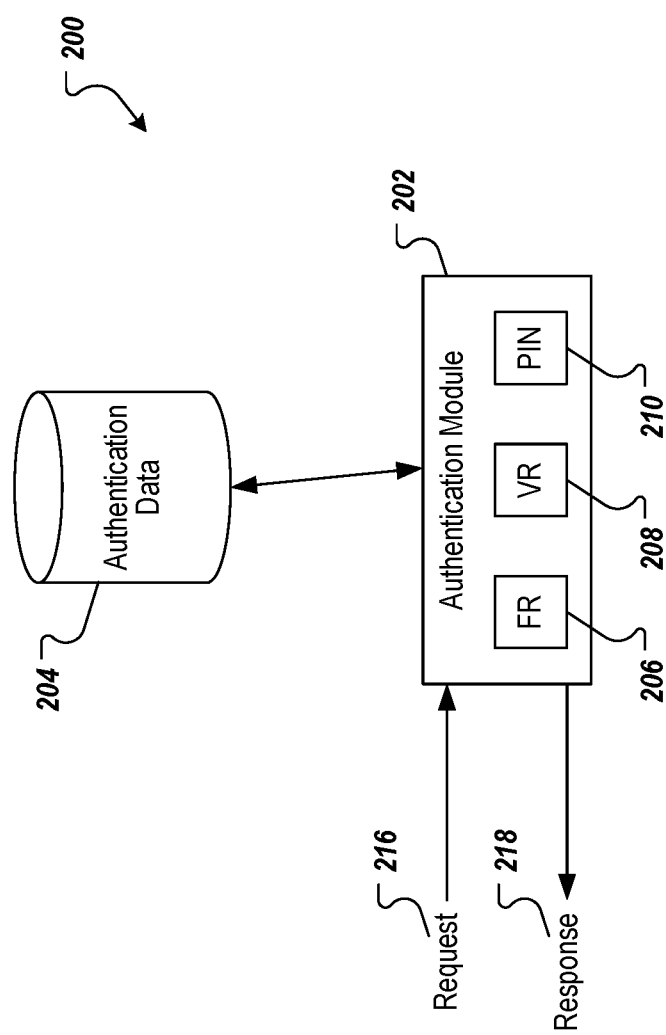
FIG. 2 depicts an example portion of a system that can be used to realize implementations of the present disclosure.

FIG. 2 depicts an example portion of a system 200 that can be used to realize implementations of the present disclosure. In some examples, the system 200 is provided as a portion of the service that is hosted by the back-end system (e.g., the back-end system 106 of FIG. 1). In some examples, the system 200 is independent of the service that is hosted by the back-end system, but receives requests from and provides responses to the service. In some examples, the system 200 is provided as a portion of an application that is executed by the computing device (e.g., the computing device 102, 104 of FIG. 1). In some examples, the system 200 is independent of the application that is executed by the computing device, but receives requests from and provides responses to the application.

The example system 200 includes an authentication module 202 and an authentication data store 204. In the depicted example, the authentication module 202 includes a facial recognition sub-module 206, a voice recognition sub-module 208 and a PIN sub-module 210. It is contemplated that the authentication module 202 can include any appropriate sub-modules (e.g., fingerprint recognition, iris recognition, retina recognition, hand geometry recognition, vein recognition). In some examples, the authentication module 200 and each of the sub-modules 206, 208, 210 are provided as one or more computer-executable programs that can be executed by one or more computing devices (e.g., computing device 102, 104, server system 114).

In some implementations, the authentication module 202 authenticates a user based on authentication data stored in the authentication data store 204. For example, the authentication module 202 can receive a request 216 for authentication of a user. In some examples, the request includes a data set that can include, without limitation, a user identifier and authentication data. In some examples, the authentication module 202 determines a form of authentication to be used based on the authentication data, and provides the request to an appropriate sub-module. For example, if the authentication data includes image data, the request can be provided to the facial recognition sub-module 206. As another example, if the authentication data includes audio data, the request can be provided to the voice recognition sub-module 208.

In some implementations, authentication data associated with the user is provided from the authentication data store 204. In some examples, the authentication data store 204 stores ground-truth authentication data provided by the user (e.g., during an enrollment process), and is indexed by the user identifier, which is unique to the user. Authentication data is retrieved from the authentication data store 204 based on the user identifier and authentication data provided in the request. For example, if the authentication data includes image data, the facial recognition sub-module 206 can retrieve ground-truth image data from the authentication data store 204 based on the user identifier. As another example, if the authentication data includes audio data, the voice recognition sub-module 206 can retrieve ground-truth audio data from the authentication data store 204 based on the user identifier.

In some implementations, the user is authenticated based on a comparison between the ground-truth authentication data and the authentication data received with the request. In some examples, if the authentication data received with the request is sufficiently similar to the ground-truth authentication data, the user is determined to be authentic. Consequently, a response 218 can be provided, which includes data indicating that the user has been authenticated. In some examples, if the authentication data received with the request is not sufficiently similar to the ground-truth authentication data, the user is determined to be inauthentic. Consequently, a response 218 can be provided, which includes data indicating that the user is not authenticated.

In some examples, it can be determined that the authentication data received with the request is insufficient to conduct user authentication. For example, the image data can be insufficient, such that a sufficiently clear image of the user's face is not determinable. Consequently, a response 218 can be provided, which includes data indicating that facial recognition cannot be performed. In some examples, the response 218 further includes data indicating why facial recognition cannot be performed (e.g., too dark, too blurry). As another example, the audio data can be insufficient, such that a sufficiently clear audio of the user's voice is not determinable. Consequently, a response 218 can be provided, which includes data indicating that voice recognition cannot be performed. In some examples, the response 218 further includes data indicating why voice recognition cannot be performed (e.g., too noisy).

In some implementations, user access to secure data is allowed or denied based on the response 218 received from the authentication module 202.

In some implementations, the authentication module 202 processes context data to suggest one or more authentication forms based on an environment of the user. For example, a request 216 can include context data that can be processed by one or more of the sub-modules. For example, the facial recognition sub-module 206 and the voice recognition sub-module 208 can each process context data to provide a response 218 indicating whether a respective authentication can be performed. In one example, the facial recognition sub-module 206 can process image data to determine a level of ambient light. In some examples, the facial recognition sub-module 206 can compare the level of ambient light to a threshold level, and, if the level of ambient light does not exceed the threshold level, it can be determined that the environment that the user is in is too dark for facial recognition. If the level of ambient light meets or exceeds the threshold level, it can be determined that the environment that the user is in is sufficiently light for facial recognition. In another example, the voice recognition sub-module 208 can process audio data to determine a level of ambient noise. The level of ambient noise can be compared to a threshold level, and, if the level of ambient noise does not exceed the threshold level, it can be determined that the environment that the user is in is too noisy for voice recognition. If the level of ambient noise meets or exceeds the threshold level, it can be determined that the environment that the user is in is sufficiently quiet for voice recognition. In some examples, the response 218 includes data, which indicates one or more authentication forms that can be used and/or one or more authentication forms that cannot be used based on the environment of the user.

FIGS. 3A-3D depict screenshots that can be provided in implementations of the present disclosure. The example screenshots correspond to the example context, which includes the user logging into a financial service, through which the user is able to access financial data (e.g., bank accounts, investments), transfer or deposit assets, and pay bills.

FIG. 3A depicts an example computing device 300 (e.g., a smartphone) displaying a selection screen 302. In some examples, the user can used the computing device 300 to log into a service provided by a back-end system. For example, a log-in screen (not depicted) can be provided, through which the user can provide credentials (e.g., username, password). The user can be primarily authenticated based on the credentials and, in response, the selection screen 302 can be displayed.

In the depicted example, the selection screen 302 includes an accounts selection 304, a transfer/deposit selection 306, a pay bills selection 308, an investments selection 310, a claims center selection 312, and a goals selection 314. In some examples, the user can select the accounts selection 304 to initiate access to one or more accounts (e.g., checking account, saving account), the transfer/deposit selection 306 to initiate access to an asset transfer and/or asset deposit service, the pay bills selection 308 to enable access to a bill pay service, the investments selection 310 to initiate access to one or more investment accounts, the claims center selection 312 to initiate access to an insurance claims service, or the goals selection 314 to initiate access to a goals service (e.g., through which the user establishes and tracks one or more financial goals). In some examples, at least one of the selections is associated with secure data. Consequently, a secondary authentication is initiated in response to user selection. For example, in response to selection of the accounts selection 304 from the selection screen 302, the secondary authentication is initiated.

FIG. 3B depicts an authentication screen 320. For example, the authentication screen 320 can be displayed in response to user selection of the accounts selection 304 from the selection screen 300. The example authentication screen 320 includes a menu 322 of available authentication forms. In the depicted example, the menu 322 includes a plurality of user-selectable elements 324, 326, 328 (e.g., button elements). In the depicted example, the authentication forms include facial recognition, PIN, and voice recognition. For example, it can be determined that the user (e.g., David) has the authentication forms facial recognition, PIN, and voice recognition established in his user profile. The user-selectable element 324 corresponds to facial recognition, the user-selectable element 326 corresponds to PIN, and the user-selectable element 328 corresponds to voice recognition.

In the example of FIG. 3B, the user-selectable element 324 is selected, indicating that the secondary authentication is to be performed using facial recognition. In some examples, it can be determined that the default authentication form is facial recognition (e.g., the user has selected facial recognition as the default in the user profile). In some examples, none of the user-selectable elements 324, 326, 328 are selected, and the user selects the user-selectable element 324. In the example of FIG. 3B, the authentication screen 320 includes an image 330 that can be processed for authenticating the user based on facial recognition. In some examples, image data is captured using a camera of the computing device, which image data is used to display the image 330. In some examples, the image 330 is a static image. In some examples, the image 330 is a dynamic image (e.g., live video image).

FIG. 3C depicts an authentication screen 340. For example, the authentication screen 340 can be displayed in response to user selection of the user-selectable element 326 from the menu 322 displayed in the authentication screen 320 of FIG. 3B. In the example of FIG. 3C, the authentication screen 340 includes the menu 322 and the user-selectable elements 324, 326, 328, the user-selectable element 326 being selected. The authentication screen 340 includes an input interface 342 that enables the user to input a PIN (e.g., 4-digit PIN).

FIG. 3D depicts an authentication screen 350. For example, the authentication screen 350 can be displayed in response to user selection of the user-selectable element 328 from the menu 322 displayed in the authentication screen 320 of FIG. 3B or the authentication screen 340 of FIG. 3C. In the example of FIG. 3D, the authentication screen 350 includes the menu 322 and the user-selectable elements 324, 326, 328, the user-selectable element 328 being selected. The authentication screen 350 includes an input interface 352 that enables the user to input record audio. For example, the user can select an icon 354, and in response, a microphone of the computing device 300 can be activated to capture audio data.

Figure 4:
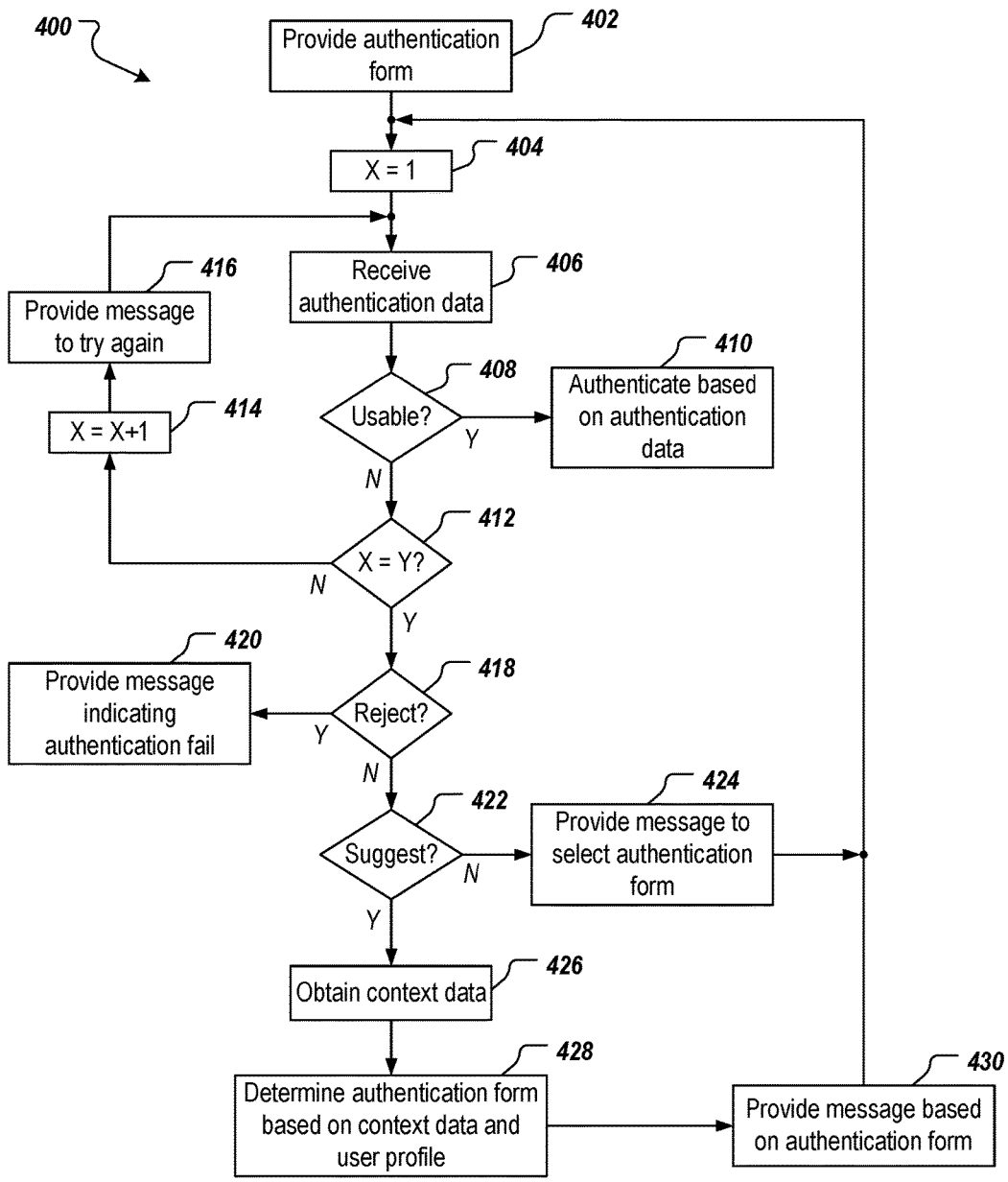
FIG. 4 depicts an example process that can be executed in accordance with implementations of the present disclosure.

FIG. 4 depicts an example process 400 that can be executed in accordance with implementations of the present disclosure. The example process 400 can be implemented, for example, by the example environment 100 of FIG. 1. In some examples, the example process 400 can be provided by one or more computer-executable programs executed using one or more computing devices. For example, the example process 400, or portions thereof, can be provided by one or more programs executed on a computing device 102, 104 and/or a server system 114 of FIG. 1.

An authentication form is provided (402). For example, a user selection can be received, which indicates a user-selected authentication form. In some examples, the user selection can be received through a menu of available authentication forms displayed in an authentication interface on a computing device. As another example, the authentication form can be a default authentication form. For example, a user profile can indicate a default authentication form. Consequently, an authentication interface corresponding to the default authentication form can be displayed to a user. For example, and with reference to FIG. 3B, the authentication interface 320 can be displayed on the computing device 300 in response to facial recognition being the default authentication form. A counter X is set equal to 1 (404). In some examples, the counter X is used to count the number of times authentication has been unsuccessful for a particular authentication form. Authentication data is received (406). For example, the user can provide authentication data using an authentication interface displayed on a computing device. In some examples, the authentication data is included in a request (e.g., a request 216 received by the authentication module 202 of FIG. 2).

It is determined whether the authentication data is usable (408). In some examples, the authentication data may be insufficient for use to authenticate the user. For example, a sub-module of the authentication module 202 can process the authentication data and can determine whether the authentication data is sufficient for a respective authentication form. If the authentication data is usable, authentication can be performed based on the authentication data (410). For example, a sub-module of the authentication module 202 can process the authentication data and can determine whether the user that provided the authentication data is authentic based on a respective authentication form. If the authentication data is not usable, it is determined whether the counter X is equal to a threshold Y (412). If the counter X is not equal to the threshold Y, the threshold number of authentication attempts has not been achieved. Consequently, the counter X is incremented (414), and a message is displayed to the user to again attempt authentication (416).

In some examples, the user can select a different authentication form before again attempting authentication. If the user selects a different authentication form, the example process 400 can begin again.

If the counter X is equal to the threshold Y, the threshold number of authentication attempts has been achieved. Consequently, it is determined whether to reject authentication of the user (418). If authentication of the user is rejected, a message is provided indicating an authentication failure (420). For example, a message can be displayed on the computing device. In some examples, if authentication of the user is rejected, PIN authentication is automatically selected and/or quick log-in is no longer available to the user. If authentication of the user is not rejected, it can be determined whether an authentication form is to be suggested to the user (422). If an authentication form is not to be suggested to the user, a message is provided to the user to select an authentication form (424). For example, a message is displayed on the computing device.

If an authentication form is to be suggested to the user, context data is obtained (426). For example, a camera and/or microphone of the computing device can be activated to capture ambient light data and/or ambient noise data (individually or collectively, "context data"). In some examples, the context data is provided to the authentication module 202 in a request 216. One or more authentication forms can be determined based on the context fata and the user profile (428). For example, if the context data indicates that voice recognition can be used, and the user profile indicates that the user has established voice recognition as an authentication form, voice recognition can be suggested to the user. A message is provided based on the authentication form(s) (430). For example, a message can be displayed to the user, which indicates the authentication form(s) suggested for user selection.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   storing a plurality of known locations and a plurality of functions, wherein each function of the plurality of functions is associated with a respective known location of the plurality of known locations;
   determining a current location of a user device;
   comparing the current location of the user device to the plurality of known locations and, based on the comparing, determining that the current location of the user device corresponds to a known location of the plurality of known locations;
   determining a plurality of suggested authentication forms that are appropriate for the known location based on a function of the plurality of functions that is associated with the known location;
   providing, for presentation on the user device, a first authentication interface that corresponds to a first authentication form, wherein the first authentication form is indicated, in a user profile for a user of the user device, as a default authentication form previously selected by the user;
   receiving first authentication data provided through the first authentication interface;
   in response to receiving an indication that the user of the user device cannot be authenticated based on the first authentication data, providing, for presentation on the user device, a menu indicating the plurality of suggested authentication forms, wherein the first authentication form is absent from the menu;
   receiving, via selection through the menu, an indication of a selected authentication form that is selected from the plurality of suggested authentication forms;
   providing, for presentation on the user device, an authentication interface that corresponds to the selected authentication form;
   receiving authentication data provided through the authentication interface; and
   in response to authenticating a user of the user device based on the authentication data, establishing a communication session between the user device and a back-end system.

2. The method of claim 1, further comprising:
   receiving a user selection to access a service provided by a back-end system, wherein the user selection is received from a selection screen displayed on the user device, and wherein the menu is provided in response to the user selection to access the service.

3. The method of claim 1, wherein the plurality of suggested authentication forms include one or more of facial recognition, voice recognition, fingerprint recognition, iris recognition, retina recognition, hand geometry recognition, vein recognition, and personal identification number (PIN) recognition.

4. The method of claim 1, wherein the menu presents a graphical representation for each of the plurality of suggested authentication forms.

5. The method of claim 1, wherein each of the plurality of suggested authentication forms has been previously established, by a user of the user device, with a back-end system.

6. The method of claim 1, wherein the user device is capable of accepting authentication data for each of the plurality of suggested authentication forms.

7. A system comprising:
   a data store for storing a plurality of known locations and a plurality of functions, wherein each function of the plurality of functions is associated with a respective known location of the plurality of known locations; and
   at least one processor configured to interact with the data store, the at least one processor being further configured to execute computer-readable instructions to perform operations comprising:
   determining a current location of a user device;
   comparing the current location of the user device to the plurality of known locations and, based on the comparing, determining that the current location of the user device corresponds to a known location of the plurality of known locations;
   determining a plurality of suggested authentication forms that are appropriate for the known location based on a function of the plurality of functions that is associated with the known location;
   providing, for presentation on the user device, a first authentication interface that corresponds to a first authentication form, wherein the first authentication form is indicated, in a user profile for a user of the user device, as a default authentication form previously selected by the user;
   receiving first authentication data provided through the first authentication interface;
   in response to receiving an indication that the user of the user device cannot be authenticated based on the first authentication data, providing, for presentation on the user device, a menu indicating the plurality of suggested authentication forms, wherein the first authentication form is absent from the menu;
   receiving, via selection through the menu, an indication of a selected authentication form;
   providing, for presentation on the user device, an authentication interface that corresponds to the selected authentication form;
   receiving authentication data provided through the authentication interface; and in response to authenticating the user of the user device based on the authentication data, establishing a communication session between the user device and a back-end system.

8. The system of claim 7, the operations further comprising:
providing, for presentation on the user device, a first authentication interface that corresponds to a first authentication form;
receiving first authentication data provided through the first authentication interface; and
in response to receiving an indication that a user of the user device cannot be authenticated based on the first authentication data, providing the menu indicating the plurality of suggested authentication forms.

9. One or more non-transitory computer storage media storing instructions that, when executed by at least one processor, cause the at least one processor to perform operations comprising:
storing a plurality of known locations and a plurality of functions, wherein each function of the plurality of functions is associated with a respective known location of the plurality of known locations;
determining a current location of a user device;
comparing the current location of the user device to the plurality of known locations and, based on the comparing, determining that the current location of the user device corresponds to a known location of the plurality of known locations;
determining a plurality of suggested authentication forms that are appropriate for the known location based on a function of the plurality of functions that is associated with the known location;
providing, for presentation on the user device, a first authentication interface that corresponds to a first authentication form, wherein the first authentication form is indicated, in a user profile for a user of the user device, as a default authentication form previously selected by the user;
receiving first authentication data provided through the first authentication interface;
in response to receiving an indication that the user of the user device cannot be authenticated based on the first authentication data, providing, for presentation on the user device, a menu indicating the plurality of suggested authentication forms, wherein the first authentication form is absent from the menu;
receiving, via selection through the menu, an indication of a selected authentication form;
providing, for presentation on the user device, an authentication interface that corresponds to the selected authentication form;
receiving authentication data provided through the authentication interface; and
in response to authenticating the user of the user device based on the authentication data, establishing a communication session between the user device and a back-end system.

10. The one or more non-transitory computer storage media of claim 9, the operations further comprising:
providing, for presentation on the user device, a first authentication interface that corresponds to a first authentication form;
receiving first authentication data provided through the first authentication interface; and
in response to receiving an indication that a user of the user device cannot be authenticated based on the first authentication data, providing the menu indicating the plurality of suggested authentication forms.

11. The method of claim 1, wherein the determining the plurality of suggested authentication forms that are appropriate for the known location, and the providing, for presentation on the user device, the menu indicating the plurality of suggested authentication forms are performed in response to detecting at least two failed attempts to authenticate the user of the user device based on unusable authentication data using a first authentication form that is different than the plurality of suggested authentication forms.

12. The method of claim 1, comprising:
receiving an indication that an authentication attempt via the authentication interface failed; and
providing, for presentation on the user device, an indication of why the authentication attempt failed.

13. The method of claim 1, wherein the function that is associated with the known location is movie theater, wherein the plurality of suggested authentication forms comprise personal identification number (PIN) recognition but do not comprise facial recognition or voice recognition.

14. The method of claim 1, wherein the function that is associated with the known location is library, wherein the plurality of suggested authentication forms comprise facial recognition and personal identification number (PIN) recognition but do not comprise voice recognition.

15. The system of claim 7, wherein the function that is associated with the known location is movie theater, wherein the plurality of suggested authentication forms comprise personal identification number (PIN) recognition but do not comprise facial recognition or voice recognition.

16. The system of claim 7, wherein the function that is associated with the known location is movie theater, wherein the plurality of suggested authentication forms comprise personal identification number (PIN) recognition but do not comprise facial recognition or voice recognition.

17. The system of claim 7, wherein the at least one processor is configured to execute computer-readable instructions to perform operations comprising:
receiving first authentication data provided through the first authentication interface; and
determining that the first authentication data is unusable, wherein the determining the plurality of suggested authentication forms that are appropriate for the known location, and the providing, for presentation on the user device, the menu indicating the plurality of suggested authentication forms are performed in response to determining that the first authentication data is unusable.

* * * * *